United States Patent [19]

Amer

[11] Patent Number: 4,599,234
[45] Date of Patent: Jul. 8, 1986

[54] SYNERGISTIC DIET COMPRISING SELENIUM BASED COMPOUNDS

[76] Inventor: M. Samir Amer, 155 North St., Greenwich, Conn. 06830

[21] Appl. No.: 539,863

[22] Filed: Oct. 7, 1983

[51] Int. Cl.⁴ .................. A61K 33/04; A61K 31/07; A61K 31/05

[52] U.S. Cl. .................. 424/164; 514/725; 514/7.31

[58] Field of Search .................. 424/164, 344, 346; 514/725, 7.31

[56] References Cited

U.S. PATENT DOCUMENTS 3,906,108  9/1975  Felty .................. 424/344 X
4,228,159 10/1980  MacMillan .................. 424/344 X
4,333,924  6/1982  Bowley et al. .................. 424/344 X

OTHER PUBLICATIONS

Abstract of AUS 12 58 527 published 1/11/68.
Griffen A. Clark, *Advances in Cancer Research*, 29, pp. 419–441, "Role of Selenium in the Chemoprevention of Cancer", 1979.
Med. Serv. Bull. 4(10), "Preventing Cancer and Hear Disease with Beta-Carotene, Aspirin", 1982.
Peto et al., *Nature*, 290, pp. 201–208, "Can Dietary Beta-Carotene Materially Reduce Human Cancer Rates?" (Mar. 19, 1981).
Wattenberg, Lee W., *Inhibitors of Chemical Carcinogenesis*, pp. 197–226.
The Washington Post, pp. A1, A3, "Natural Cargingens in Diet Said to Top Man-Made", (Sep. 16, 1983).

Primary Examiner—Jerome D. Goldberg
Assistant Examiner—John W. Rollins, Jr.

[57] ABSTRACT

The effect of carcinogens is negated in mice by a synergistic diet comprising a source of selenium, butylated hydroxytoluene or butylated hydroxyanisole, and β-carotene.

4 Claims, No Drawings

SYNERGISTIC DIET COMPRISING SELENIUM BASED COMPOUNDS

TECHNICAL FIELD

This invention relates to negating the effect of carcinogens by utilizing a special diet in lower animals such as mice.

SUMMARY OF THE INVENTION

It has now been discovered that the effect of carcinogens is reduced or negated in lower animals, such as rats, by a synergistic diet or a synergistic additive to a diet comprising by weight of the diet up to about 2% of a source of selenium (selenium basis), up to about 2% of butylated hydroxytoluene or butylated hydroxyanisole, and up to about 0.5% of $\beta$-carotene.

The term "synergistic diet" is used herein to mean a diet wherein the three mentioned components function significantly better together to negate the effect of carcinogens than a diet comprising any single one of the three components or none of them.

The percentages herein refer to percentages of a daily diet.

DETAILED DESCRIPTION

The source of selenium is preferably present in the diet or in the additive in an amount by weight of the diet (selenium basis) ranging from about 0.00025% to about 2%, more preferably from about 0.005% to about 1.2%, very preferably from about 0.1% to about 1.1%, and optimally is utilized in an amount of 1% by weight (selenium basis) of the diet.

The selenium can be included in the diet in any form which is non-toxic in the ranges specified, e.g. in the form of selenium itself, or in the form of an inorganic compound, e.g. as a selenium salt, or in the form of organic selenium or at least in part in conventional foods which normally contain some selenium.

Preferably, the source of selenium is sodium selenite. Other useful inorganic sources of selenium include, for example, selenium chloride, selenium oxide, selenium sulfide, sodium selenide, sodium selenate, selenium bromide, selenium oxybromide, selenium fluoride, selenium oxyfluoride, selenium oxychloride, selenium hexafluoride, selenium tetrabromide, selenium tetrachloride and selenium tetrafluoride.

Organic selenium is available, for example, as kelp bound selenium contained in a colloidal polymannuronate complex or as Selen-yeast which is yeast grown on media rich in selenium and/or selenium salts. Other useful organic sources include, for example, selenoamino acids, seleno-proteins and selenium-rich extracts of biological materials.

Conventional foods which can be used to supply at least part of the selenium include selenium-containing seafood and meat and grain grown in selenium-rich soil.

The butylated hydroxytoluene or butylated hydroxyanisole is preferably present in the diet or in the additive in an amount by weight of the diet ranging from 0.0005% to about 2%, more preferably from about 0.05% to about 1%, very preferably from about 0.25% to about 0.6%, and optimally is utilized in an amount of 0.5% by weight of the diet. These are readily commercially available in food grade purity and are present as additives, e.g. in fats.

The $\beta$-carotene is preferably present in the diet or in the additive in an amount by weight of the diet ranging from about 0.005% to about 0.5%, more preferably from about 0.01% to about 0.1%, very preferably from about 0.4% to about 0.08%, and optimally is utilized in the amount of 0.05% by weight of the diet. $\beta$-carotene is readily available and is used e.g. in margarine production and is present in some fats.

The diet herein is readily formulated by adding the various chemicals to a normal diet or by selecting foods containing such chemicals and, if necessary, adding chemicals to obtain the amounts herein.

If desired the chemicals can be introduced into the diet together, e.g. by a daily dosage unit, i.e. as a dietary supplement, comprising (a) a source of selenium, (b) butylated hydroxytoluene or butylated hydroxyanisole, and (c) $\beta$-carotene wherein the weight ratio of a:b (with (a) being considered on a selenium basis) ranges from about 10:1 to about 1:50, preferably from about 3:1 to about 1:1 and the weight ratio of b:c ranges from about 20:1 to about 1:100, preferably from about 12:1 to about 8:1. Preferably, the weight ratio of a:c, with (a) being considered on a selenium basis, ranges from about 40:1 to about 1:50, and very preferably from about 24:1 to about 16:1. The weight ratio of a:b:c optimally is 1:0.5:0.05.

In one embodiment the daily dosage unit comprises by weight from about 5 to about 250 micrograms of a source of selenium (selenium basis), from about 50 micrograms to about 10 milligrams of butylated hydroxytoluene or butylated hydroxyanisole and from about 5 to about 250 micrograms of $\beta$-carotene.

A preferred embodiment of the invention herein is illustrated in the following specific example.

EXAMPLE

A study was carried out on 5 groups of young female rats of the Sprague Dawley variety (10 animals/group).

Carcinogens were administered to each of the groups according to standard protocols as follows: 3'-methyl-4-dimethyl-aminobenzene was included in the daily diet of each group of rats at a level of 0.06% by weight over a 10 week period. Starting during the second week, methylazoxy methanol acetate was administered subcutaneously on a weekly basis at a level of 10 mg/kg (of the weight of the rats). During the third week, 7,12-dimethylbenz(a)anthracene was administered once as an oral intubation at a level of 8 mg/kg (of the weight of the rats).

The five groups of animals were treated as follows: Group I received the carcinogens alone. Group II received the carcinogens plus a daily diet including 1% by weight of selenium as $Na_2(SeO_3)$. Group III received the carcinogens plus a daily diet including 0.5% by weight butylated hydroxytoluene. Group IV received the carcinogens plus a daily diet including 0.05% by weight $\beta$-carotene. Group V received the carcinogens plus a diet including by weight 1% selenium, as $Na_2(SeO_3)$, 0.5% butylated hydroxytoluene, and 0.05% $\beta$-carotene.

At the end of 10 weeks, the animals were examined for general signs of toxicity. Laparotomies were conducted on all survivors and a gross visual examination and a histochemical examination of all nodules was carried out.

Mortality rates were as follows:
Group I—90%
Group II—80%
Group III—70%

Group IV—70%
Group V—20%

No toxicity other than hyperplastic nodules (a detectable stage of cancer) was found in any of the survivors.

The experiment showed that the invention (Group V) demonstrated significantly better negation of the effects of the carcinogens compared to either of the components alone (Groups II, III and IV). Each of the carcinogens produces a special pattern of tumors different from the others. From the types of tumors produced and inhibited, it was clear that each of the ingredients had an effect on the tumors produced by all three carcinogens.

While the foregoing describes preferred embodiments, modifications within the scope of the invention will be evident to those skilled in the art. Thus, the scope of the invention is intended to be defined by the claims.

What is claimed is:

1. A synergistic diet for negating the effect of chemical carcinogens in lower animals comprising, by weight of the diet,
   (a) about 1% of a non-toxic source of selenium;
   (b) about 0.5% of butylated hydroxytoluene, and
   (c) about 0.05% of β-carotene.

2. A synergistic diet as set forth in claim 1 wherein the non-toxic source of selenium is sodium selenite.

3. A dietary supplement for negating the effect of chemical carcinogens for lower animals comprising
   (a) a non-toxic source of selenium;
   (b) butylated hydroxytoluene; and
   (c) β-carotene,
wherein the weight ratio of (a):(b):(c), with (a) being considered on a selenium basis, is about 1:0.5:0.05.

4. A dietary supplement for lower animals as set forth in claim 3 wherein the non-toxic source of selenium is sodium selenite.

* * * * *